United States Patent [19]
Omholt

[11] Patent Number: 5,302,039
[45] Date of Patent: Apr. 12, 1994

[54] PANEL COUPLER

[76] Inventor: Bruce D. Omholt, 1034 Holly, Rohnert Park, Calif. 94928

[21] Appl. No.: 928,827

[22] Filed: Aug. 11, 1992

[51] Int. Cl.[5] .................................................. F16B 5/06
[52] U.S. Cl. ..................................... 403/218; 403/178;
403/256; 403/338; 403/DIG. 9; 52/285.1;
24/514; 24/135 R
[58] Field of Search ............................... 403/217–219,
403/4, 174, 178, 169, 170, 256–257, DIG. 9,
264, 373, 338, 245–247; 52/285, 286, 271;
160/135, 351; 24/514, 569, 135 R; 248/316.5

[56] References Cited

U.S. PATENT DOCUMENTS

| 1,679,758 | 8/1928 | Bauersfeld et al. ............ 403/174 |
| 3,620,558 | 11/1971 | MacMillan ..................... 403/290 |
| 3,986,316 | 10/1976 | Blodee ........................... 403/218 |
| 4,613,182 | 9/1986 | Stone . | |
| 4,619,545 | 10/1986 | Küttenbaum ................. 403/290 X |
| 4,638,614 | 1/1987 | Wilcox ............................ 52/238.1 |
| 4,730,800 | 3/1988 | Engman ...................... 248/316.5 X |
| 4,846,431 | 7/1989 | Pflieger ...................... 248/316.5 X |
| 4,856,928 | 8/1989 | Savale .......................... 403/174 X |

FOREIGN PATENT DOCUMENTS

| 722310 | 7/1942 | Fed. Rep. of Germany ...... 403/218 |
| 3729664 | 3/1989 | Fed. Rep. of Germany ...... 403/217 |
| 2600126 | 12/1987 | France ................................ 403/373 |
| 2029490 | 3/1980 | United Kingdom ................ 403/405 |

OTHER PUBLICATIONS

Outwater Plastic Industries catalog, p. 116, for Klem Universal Connector, publication date unknown.

*Primary Examiner*—Randolph A. Reese
*Assistant Examiner*—Harry C. Kim
*Attorney, Agent, or Firm*—Donald L. Beeson

[57] ABSTRACT

An improved panel coupler has a hub assembly which releaseably and adjustably holds two or more panel clamps for coupling together two or more adjoining panels. The panel clamps have keeper ends which are captured and adjustable within a keeper channel in the hub assembly such that the panel clamps are infinitely adjustable about the hub assembly, and distal clamping ends which, in turn, are adjustable for clamping onto panels having different thicknesses.

16 Claims, 3 Drawing Sheets

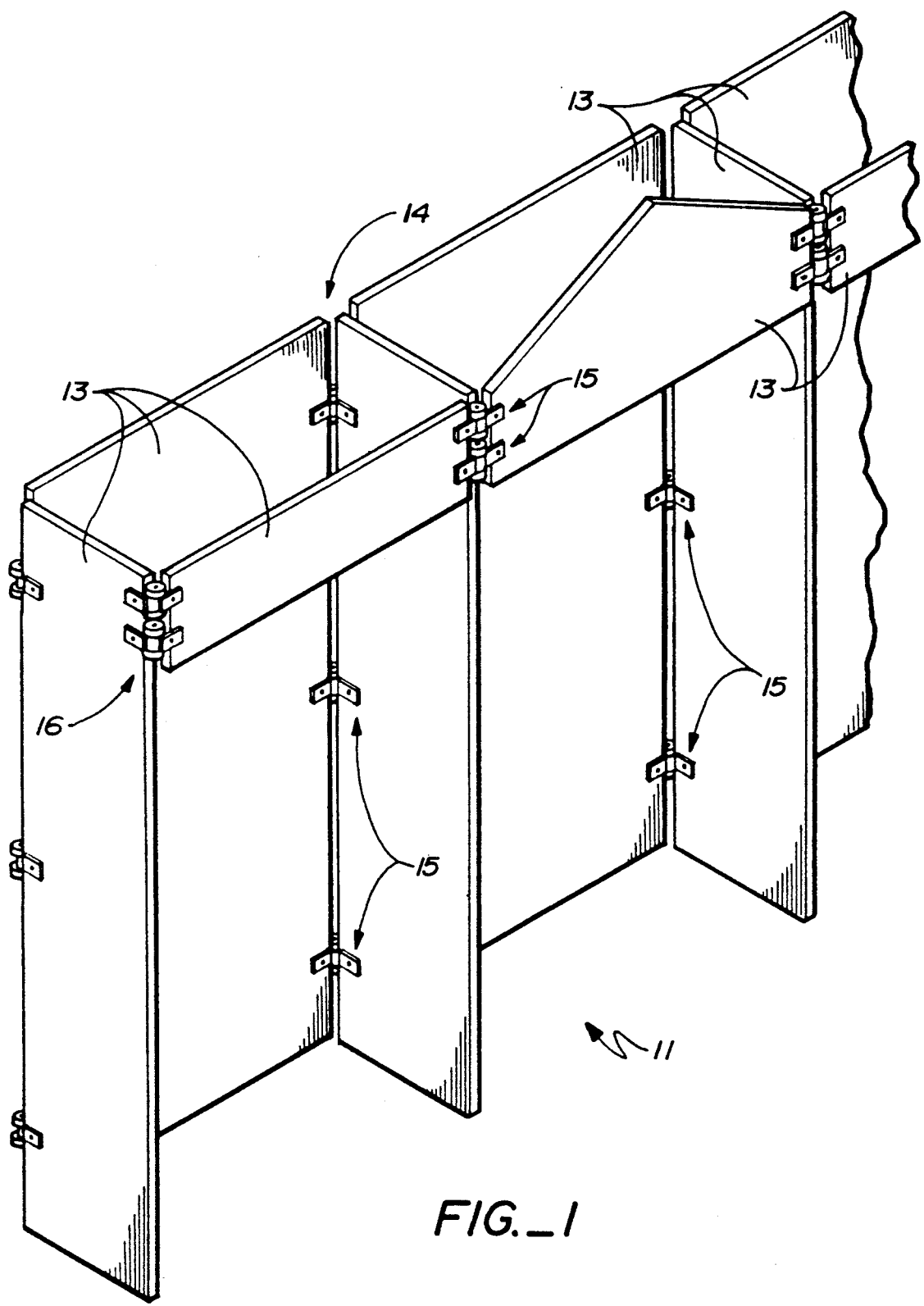
FIG._1

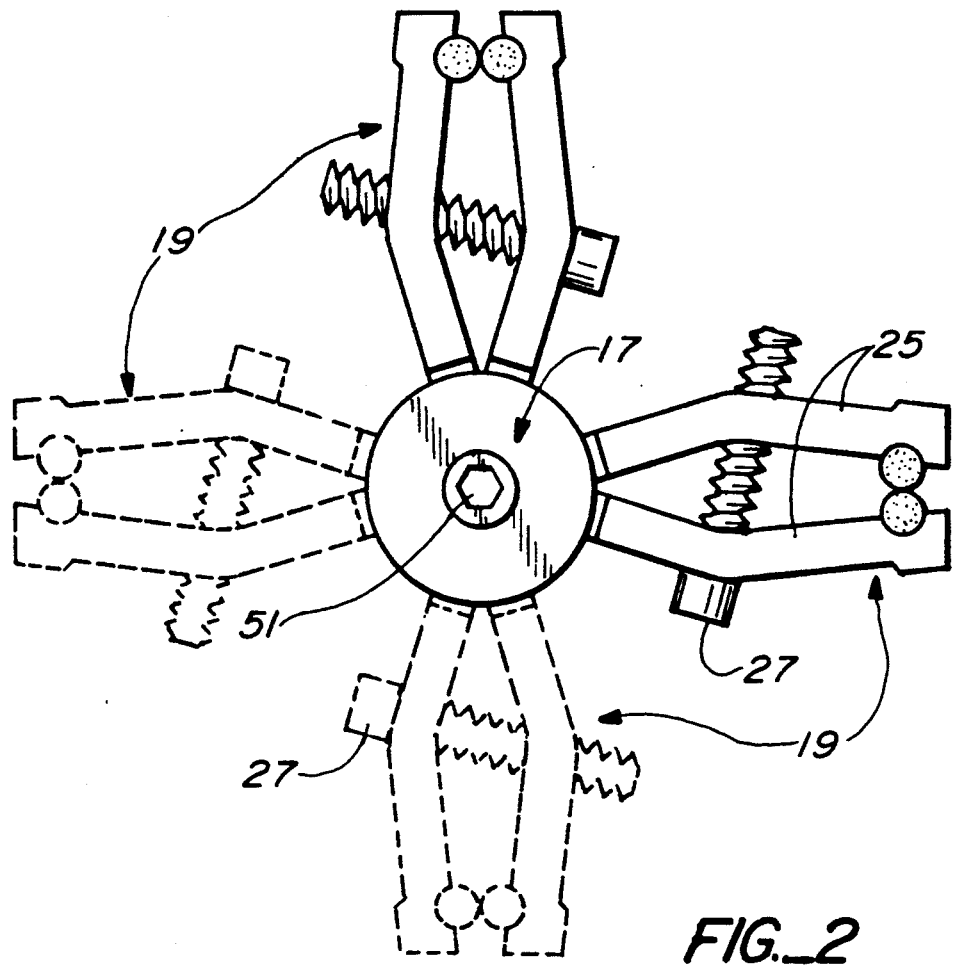
FIG._2
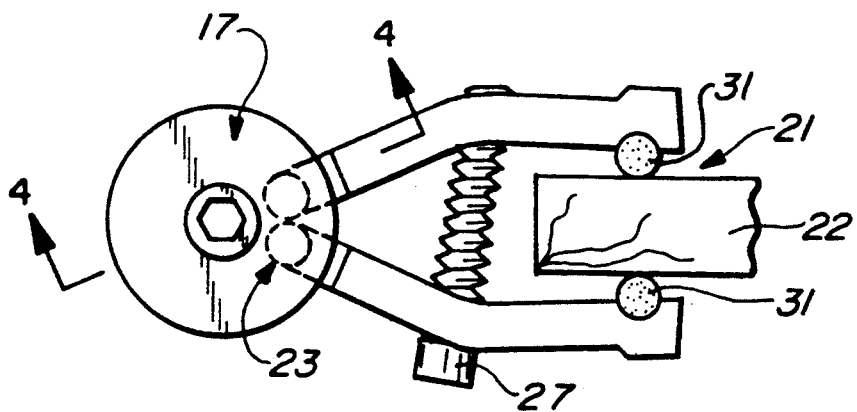
FIG._3

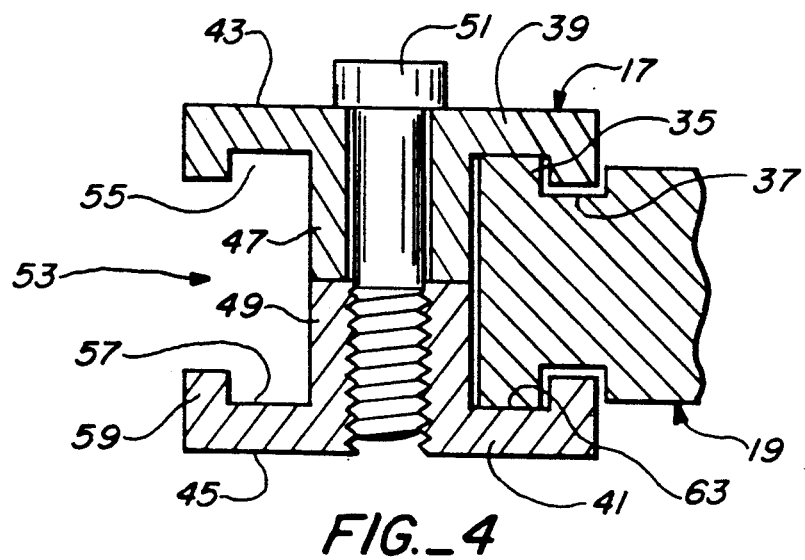
FIG._4
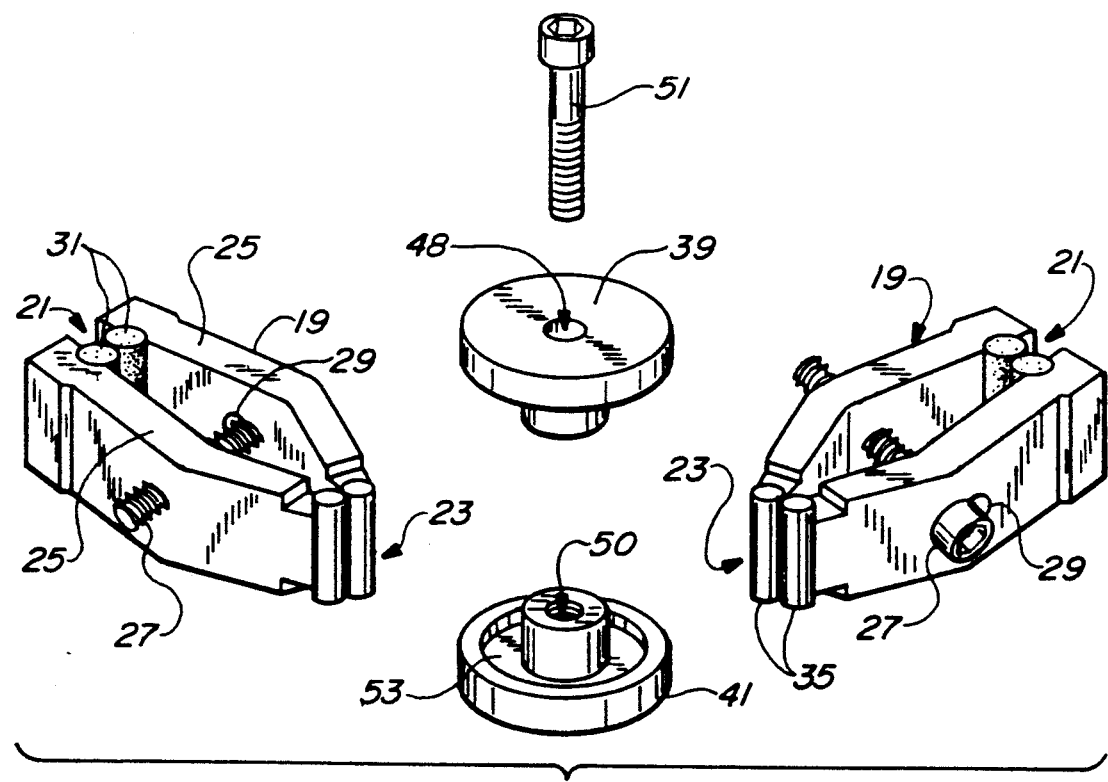
FIG._5

PANEL COUPLER

BACKGROUND OF THE INVENTION

The present invention generally relates to the construction of panel systems, and more particularly to hardware for joining panels together to form a wall and/or partition system of a desired design.

Panel systems are frequently used to erect store fronts and display systems for commercial establishments in shopping malls and other retail centers. Such systems have the advantage of reducing the required investment in remodeling a store front for a new tenant of a shopping mall, an advantage of particular importance during recessionary times when vacancy rates in shopping malls are relatively high.

The assembly of a panel system involves joining individual panel elements together using suitable connecting hardware. One of the most common types of connecting hardware is an angle bracket which is screwed directly into adjacent edges of adjoining panels. Angle brackets, however, are relatively difficult to install and leave screw holes in the panels which may prevent the reuse of the panel or which may require the panel be repaired before reuse. Other connectors are known that grip the panel but do not physically penetrate the panel surface. Such connectors include extruded corner pieces having fixed width panel receiving channels formed at fixed angles, for example, 90° and 180° corner pieces. Prior panel connectors also exist which permit panels to be joined at adjustable angles, but such connectors require hardware modifications for accommodating different panel thicknesses, and are capable of handling only two panels: if three or more panels come together at a panel joint, multiple connectors are required.

The present invention overcomes the foregoing disadvantages of prior panel connectors by providing an universal panel coupler that can easily be adapted to receive two, three, or more panels for coupling two, three or more panels together as required, and which at the same time permits adjustment of the position of the coupled panels relative to each other. The panel coupler of the invention is further adjustable to secure panels of different thicknesses and materials without the need to modify the coupler.

SUMMARY OF THE INVENTION

Briefly, the invention involves a panel coupler having a hub means which releaseably captures the keeper ends of two or more panel clamps in such a way that the relative positions of the panel clamps can be adjusted about the hub means. Specifically, the hub means has keeper means for holding the keeper ends of the panel clamps. The hub's keeper means is preferably in the form of a continuous keeper channel extending about the hub means to provide for infinitely variable, 360 degrees of adjustment of the panel clamps. However, it is understood that a keeper means for the hub can be provided in a form other than a continuous keeper channel, such as discreet keeper openings in the hub which permits only discreet adjustment of the panel clamps.

Preferably, the hub means is an assembly comprised of first and second hub sections which, when joined together, form a keeper channel or other keeper means in the hub and which allow the keeper ends of the panel clamps to be inserted in the keeper channel when the hub sections are separated. Fastening means, preferably in the form of a fastening screw that extends through a center portion of the hub assembly, releaseably holds the hub sections together. By releasing the fastening means, panel clamps can be added to or removed from the hub assembly depending on the number of panel clamps desired.

Each of the panel clamps of the invention is preferably adjustable to permit the clamps to clamp onto panels of different thicknesses. This is achieved by providing panel clamps having clamping arms, the spread of which is adjustable such as by an adjustment screw extending through the clamps. In the illustrated embodiment, the clamping arms of the panel clamps each have separate keeper ends which are separately retained within a keeper channel of the hub assembly such that the clamping arms can be adjustably rotated relative to each other. However, it is understood that panel clamps can be provided having a single keeper end, provided the panel clamps are fabricated of a material that will permit adequate flexure of the clamping arms for clamping thickness adjustments. Such an unitary panel clamp could, for example, be fabricated as a molded plastic part.

While the hub assembly of the invention is described herein as a circular hub assembly that permits the angular position of the panel clamps to be adjusted through a 360 degree rotation, the invention also contemplates that the hub assembly may be provided in other shapes, such as an oblong shape that permits not only angular adjustment of panels, but also offset adjustments, such as where it is desired to couple two or more panels together in an offset relation o to provide different spacings between panel edges. Indeed, the possible shapes for the hub assembly is limited only by the utility of the shapes to any perceived application for the coupler.

Therefore, it can be seen that a primary object of the invention is to provide an improved panel coupler that is capable of joining more than two panels together and which permits the number of panel clamps in the coupler to be varied depending on the user's requirements. It is a further object of the invention to provide an adjustable panel clamp that is capable of clamping panels at infinitely adjustable angles, that provides 360 degrees of adjustment, and that is further capable of handling panels of different thicknesses and materials. It is still another object of the invention to provide an improved panel coupler which has relatively few parts, which can be manufactured relatively inexpensively, and which is relatively easy to assemble and disassemble. Yet other objects of the invention will be apparent from the following specifications and claims.

DESCRIPTION OF THE DRAWINGS

FIG. 1 is a perspective view of an assembly of panels illustrating the use of the improved panel coupler of the present invention.

FIG. 2 is a top plan view of the improved panel coupler of the present invention having two panel clamps retained by the coupler's hub assembly, and showing the possible addition of panel clamps by phantom lines renditions of two further clamps.

FIG. 3 is a top plan view of the improved panel coupler of FIG. 2 with only one panel clamp retained by the coupler's hub assembly, and showing this panel clamp clamping the edge of a panel element.

FIG. 4 is a partial cross-sectional view of the panel coupler of the invention taken along section lines 4—4 of FIG. 3.

FIG. 5 is an assembly drawing of the panel coupler shown in FIG. 2 generally illustrating the manner in which the panel clamps are inserted into the hub assembly.

DETAILED DESCRIPTION OF THE ILLUSTRATED EMBODIMENT

Referring now to the drawings, FIG. 1 generally illustrates a panel system (11) comprised of individual panel elements (13) which are coupled together by means of panel couplers (15) made in accordance with the invention. The panels are joined at panel joints which are formed wherever the edges of two or more panels come together. For example, a long vertical three-panel joint at 14 is formed by three right angle, standing panels, and a relatively short vertical two-panel joint is formed at 16 by a standing panel and a relatively narrow cross-panel. As hereinafter described, the couplers at each joint will be provided with the number of clamps required to join a selected number of panels. The number of panel couplers used may vary and generally will depend on the length of the joint.

The panel system of FIG. 1 is illustrative only, and it is understood that the invention can be used to join together four or more panels to create panel configurations having both vertical and horizontal panel joints.

Referring to FIGS. 2-5, the panel couple of the invention includes a hub means in the form of a hub assembly (17) which adjustably retains two or more panel clamps (19), each of which has a distal clamping end (21) for clamping the edge of a panel (22) as shown in FIG. 3, and a keeper end (23) which is retained in the hub assembly. As best illustrated in FIG. 2, the hub assembly can accommodate multiple panel clamps depending on the number of panels that are joined at the panel joint. The number of panel clamps retained in the hub assembly is limited only by the physical dimensions of the panel clamps themselves.

The panel clamps are identical in construction and can be fabricated of various materials such as aluminum or plastic. Each is shown to have separate opposed clamping arms (25), the spread of which is made adjustable by means of a clamp adjustment screw (27). The threaded end of the adjustment screw threadedly engages one of the clamping arms while the head end of the screw extends through a relief slot (29) in the opposed arm, as shown in FIG. 5, so as to accommodate small angle changes in the adjustment screw which occur when the spread of the arms changes. A bead of resilient material (31), suitably rubber, is provided to provide resilient contact surfaces at the distal end of each clamping arm to cushion the clamping force exerted against the edge of a clamped panel. This permits the panel clamps to be used with a variety of panel materials, including glass and plastic, without risk of damaging the material.

The keeper end of each of the clamping arms is shown to be in the form of a transverse keeper post (35) formed on the end of a somewhat narrower neck portion (37) of the clamping arm. The keeper posts are retained in the hub assembly which, in the illustrated embodiment, is a circular hub assembly consisting of first and second hub sections (39, 41), having circular outer walls (43, 45), and opposing cylindrical center portions (47, 49). The hub sections are joined together by fastening means in the form of a fastening lag screw (51) which is removably inserted into the aligned fastening openings 48, 50 extending through the center portions of the hub section. As best seen in FIG. 4, the fastening opening in one of the hub sections is threaded and the other is not. By placing the hub sections together as shown and inserting the fastening lag screw through the unthreaded hub section, the hub sections can be tightened together after the keeper ends of the desired number of panel clamps have been suitably placed in the assembly.

Keeper portions in each of the opposed hub sections combine to form the keeper means of the hub assembly when the hub sections are joined together. Preferably, the keeper means is an annular T-shaped keeper channel (53) with the keeper portions of the hub sections being opposed annular channel portions (55, 57). It is readily seen that the keeper channel is adapted to receive the keeper posts (35) of the panel clamps such that the panel clamps are infinitely adjustable; that is, the panel clamps can be adjusted to any angular position about the annular channel.

While engaged in the hub, the angular position of the panel clamps may be fixed or non-fixed depending o the design of the coupler. Specifically, when the keeper end of the panel clamps are engaged in the hub assembly, the outer rim (59) of the hub's keeper channel extends into the neck portion (37) of the clamping arms of the panel clamps leaving a space between the neck and the channel's outer rim. The height of the keeper post can be selected such that the keeper post is firmly contacted by the bottom surfaces (61, 63) of the keeper channel when the hub sections are tightened together thereby providing a means for locking the selected angular positions of the panel clamps when the lag fastening screw is tightened. Alternatively, the height of the keeper post can be chosen such that when the lag screw is tightened the panel clamps remain loose and moveable within the hub assembly. This latter construction may be desirable for panel couplers holding standing panels, the angular position of which need to be regularly adjusted in their operating environment.

To use a panel coupler in accordance with the invention, the installer simply selects the number of panel clamps needed to accommodate the number of panels forming the panel joint for which the coupler is being used. For example, if the panel joint consists of two adjoining panels, two panel clamps would be selected, and if the panel joint is formed by three adjoining panels three panel clamps are selected. Referring to FIG. 5, a hub assembly 17 consisting of two hub sections 39, 41 and a hub fastening screw 51 is disassembled such that the keeper posts 35 of the panel clamps 19 can be inserted within the annular keeper channel 53 formed by the hub sections as the two hub sections are placed together against the clamp's keeper posts. The hub assembly's fastening screw is then simply inserted into the fastening opening of the hub assembly. Before the fastening screw is tightened down, the panel clamps 19 can be opened by means of the panel clamp adjustment screws 27 and clamped onto the panels to form the new panel joint and adjusted within the keeper channel to desired angular positions. Thereafter, the fastening screw for the hub assembly can be tightened down by means of an Allen wrench (or other suitable tool if an Allen head screw is not used) to fix the panel clamps in position.

Therefore, it can be seen that the present invention provides an improved panel coupler which is extremely flexible and easy to use. The panel coupler of the invention can be adapted to a variety of panel joint configurations and to a variety of different panel sizes and materials, and additionally can be used to couple one type of panel to another. While the present invention has been described in considerable detail in the foregoing specification, it is understood that the invention is not intended to be limited to such detail, except as necessitated by the following claims.

I claim:

1. An improved panel coupler comprising
at least two panel clamps, each of said panel clamps having a keeper end and a distal clamping end, the distal clamping end of each of said panel clamps being formed by two opposed clamping arms for holding a panel therebetween, each of said panel clamps further having clamping adjustment means connected between the clamping arms thereof for adjusting separation of said clamping arms and for providing positive clamping of panels of different thicknesses, and
hub means including keeper means for releasably retaining the keeper ends of said panel clamps such that said panel clamps can be releaseably and adjustably held in said hub means.

2. The panel coupler of claim 1 wherein said keeper means includes a keeper channel to provide for infinitely variable adjustment of the panel clamps about said hub means.

3. The panel coupler of claim 2 wherein the opposed clamping arms of each of said panel clamps have separate, independently retained keeper ends.

4. The panel coupler of claim 3 wherein the keeper ends of the clamping arms of each of said panel clamps have parallel keeper posts adapted to be retained by and slide within the keeper channel of said hub means.

5. The panel coupler of claim 1 wherein said hub means includes means for locking the panel clamps at adjustably selected positions within its keeper means.

6. The panel coupler of claim 1 wherein said hub means is a hub assembly that includes
joinable first and second hub sections having opposed keeper portions formed therein to form the keeper means for said panel clamps when said first and second hub sections are joined together, and
fastening means for releaseably holding the joined hub sections together.

7. The panel coupler of claim 6 wherein the opposed keeper portions in said hub sections are channel portions which form a keeper channel that extends about said hub assembly to provide for infinitely variable adjustment of the panel clamps about said hub assembly.

8. The panel coupler of claim 1 wherein said hub means is a substantially circular hub means about which said panel clamps can be adjustably rotated about said hub means.

9. The panel coupler of claim 1 wherein said clamping adjustment means includes a clamp adjustment screw operative to open and close said clamping arms upon rotations of said screw.

10. The panel coupler of claim 9 wherein said clamp adjustment screw has a threaded end and a head end and one of said clamping arms has a relief slot, and wherein the head end of said adjustment screw is engaged in said relief slot to accommodate small angle changes in the adjustment screw as the separation of the clamping arms change.

11. The panel coupler of claim 1 wherein the clamping arms of each of said panel clamps have resilient contact surfaces which contact the panels held thereby.

12. An improved panel coupler comprising
at least two panel clamps, each of said panel clamps having a keeper end and a distal clamping end, the distal clamping end of each of said panel clamps being formed by two opposed clamping arms for holding a panel therebetween, each of said panel clamps further having clamping adjustment means connected between the clamping arms thereof for adjusting separation of said clamping arms and for providing positive clamping of panels of different thicknesses, and
a substantially circular hub assembly for releasably holding said panel clamps in adjustably rotated positions relative to each other about said hub assembly, said hub assembly including
joinable first and second substantially circular hub sections having opposed keeper channel portions formed therein which form a keeper channel for retaining the keeper ends of said panel clamps when said first and second hub sections are joined together, and
fastening means for releaseably holding said joined hub sections together.

13. The panel coupler of claim 12 wherein said keeper channel is a circular keeper channel that permits a full 360 degree rotation of said panel clamps about said hub assembly.

14. An improved panel coupler comprising
at least two panel clamps, each of said panel clamps having a keeper end and a distal clamping end, the distal clamping end of each of said panel clamps being formed by two opposed clamping arms for holding a panel therebetween, and the clamping arms of each of said panels clamps having resilient contact surfaces which contact the panels held thereby,
a substantially circular hub assembly for releaseably holding said panel clamps in adjustably rotated positions relative to each other about said hub assembly, said hub assembly including
joinable first and second substantially circular hub sections having opposed keeper channel portions formed therein which form a keeper channel for retaining the keeper ends of said panel clamps when said first and second hub sections are joined together, and
fastening means for releasably holding said joined hub sections together.

15. An improved panel coupler comprising
at least two panel clamps, each of said panel clamps including a pair of opposed clamping arms having separate, independently retained keeper ends and distal clamping ends, the spread of said clamping arms being adjustable for clamping panels of different thicknesses, and
a hub assembly for releaseably holding and adjustably positioning said panel clamps about said hub assembly, said hub assembly including
joinable first and second hub sections having keeper channel portions formed therein which form a keeper channel for retaining the keeper ends of the clamping arms of said panel clamps when said first and second hub sections are joined together, and fastening means for releaseably holding said joined hub sections together.

16. The panel coupler of claim 15 wherein the first and second hub sections of said hub assembly have opposing center portions with a fastener opening therethrough and wherein said keeper channel extends around said center portion, and further wherein said fastening means includes a fastener removably insertable into said fastener opening for drawing said hub sections together to capture the keeper ends of said panel clamps in said keeper channel.

* * * * *